Patented July 12, 1932

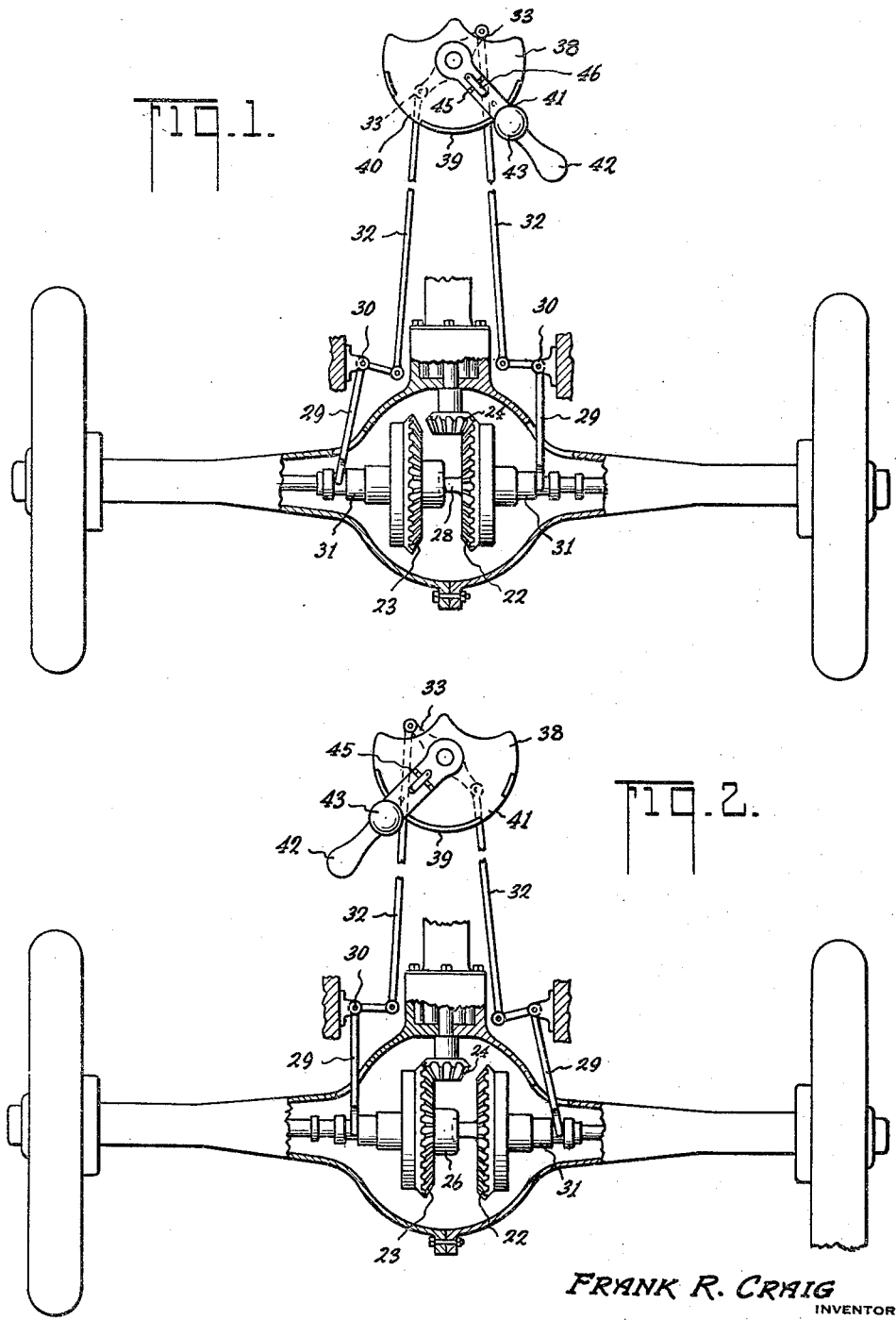

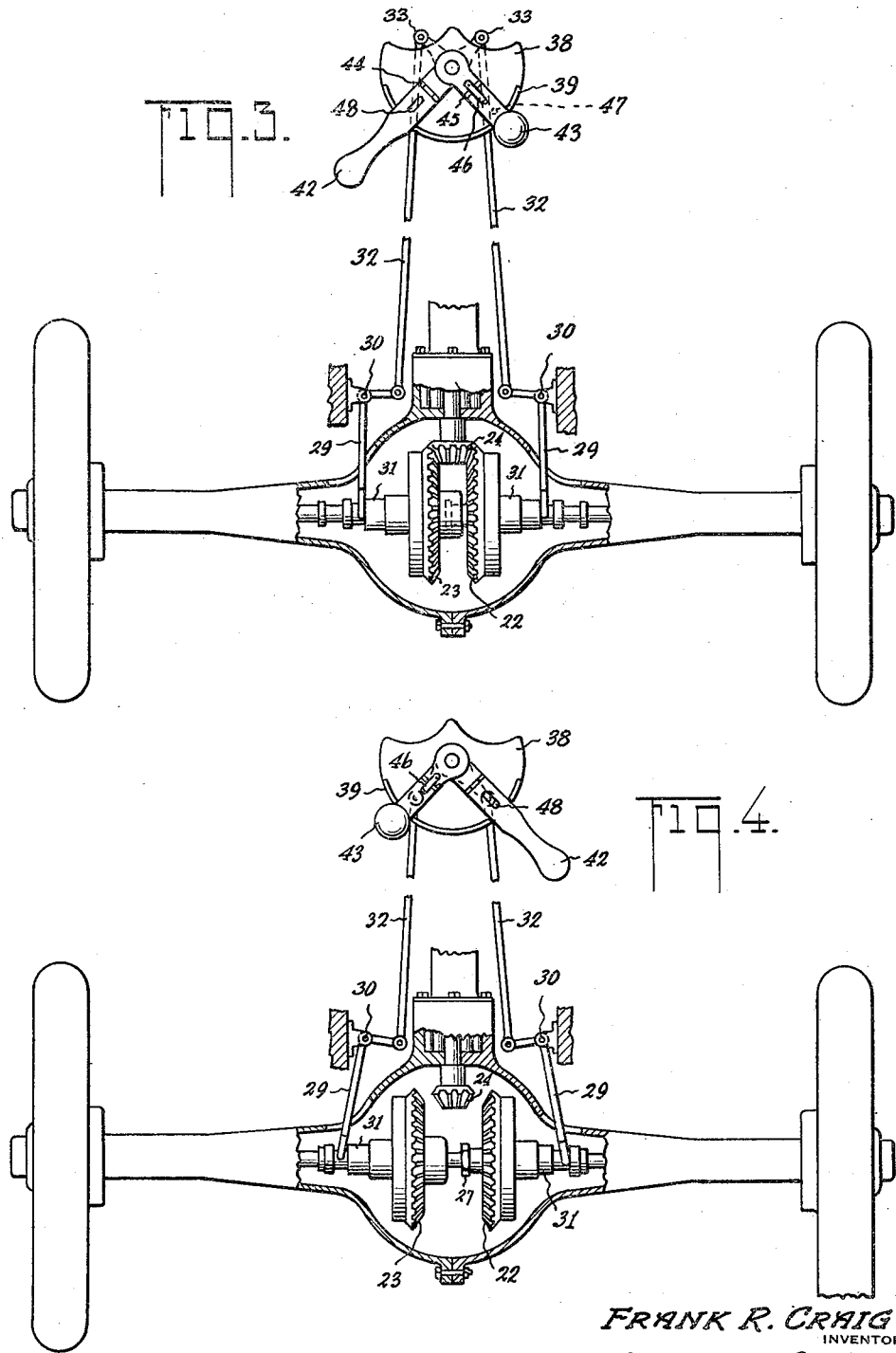

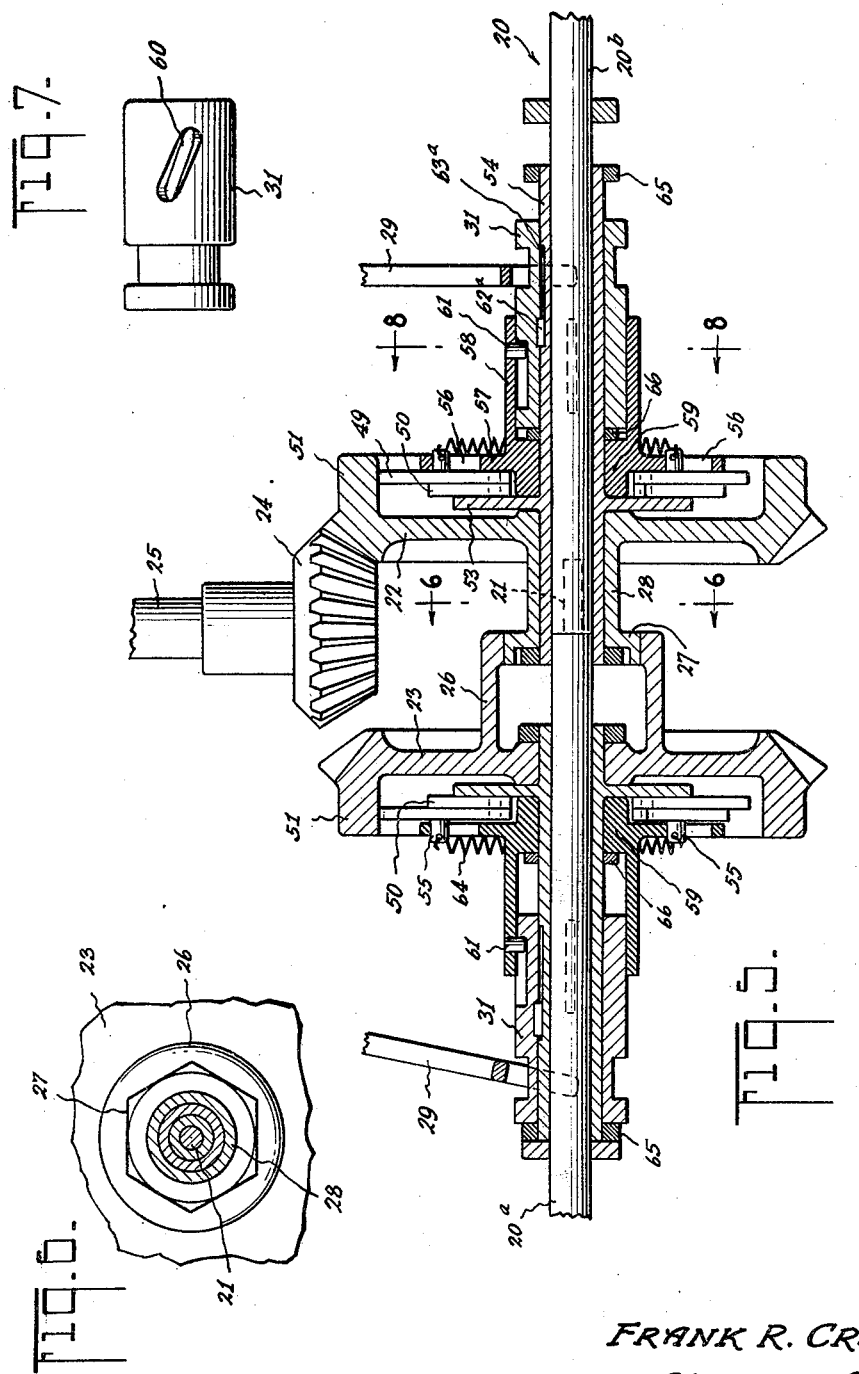

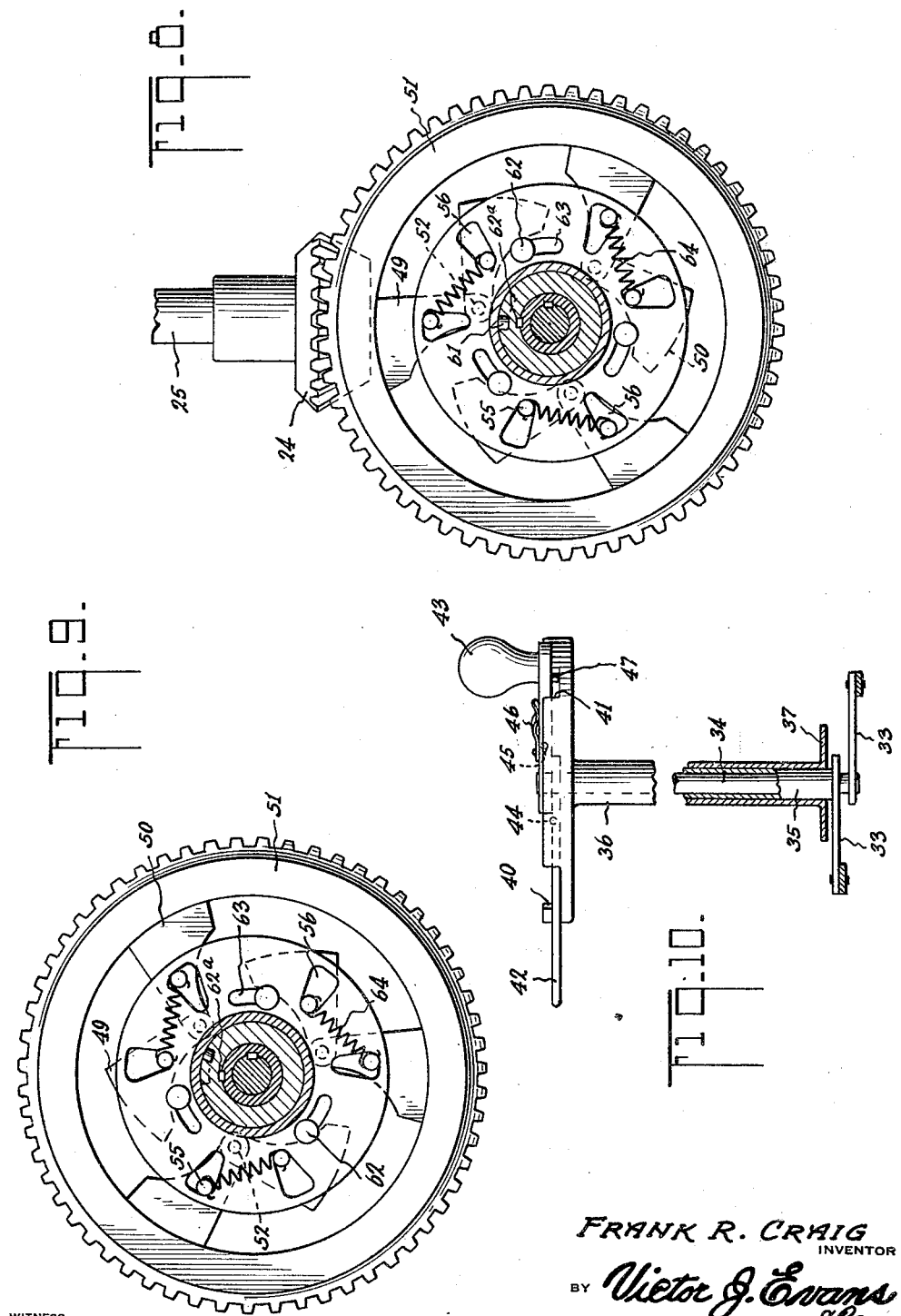

1,867,497

UNITED STATES PATENT OFFICE

FRANK R. CRAIG, OF RIVER EDGE, NEW YORK

GEARING FOR AUTO VEHICLES

Application filed July 10, 1931. Serial No. 549,989.

The object of the invention is to provide a gearing for auto vehicles, which will substantially combine in one the now conventional transmission and differential mechanisms; to provide a gearing of this nature adapted for mounting on the rear or drive axle and to be set to propel the axle in either direction for forward or rearward movement of the vehicle; to provide a mechanism susceptible of rotating the two sections of the drive axle in opposite directions for short turning; to provide a construction in which the angular speed of the axle may exceed but not fall below that of the driving mechanism, and this irrespective of whether the axle rotates forwardly or rearwardly or the two parts rotate in opposite directions; and to provide a mechanism of this nature which is of simple form and susceptible of cheap manufacture and installation in the conventional vehicle without material modification of the latter.

With this object in view, the invention consists in a construction and combination of parts, of which a preferred embodiment is illustrated in the accompanying drawings, wherein:

Fig. 1 is a plan view, partly in section, of an automobile drive axle and the connected section of the torque with the invention incorporated, the relation of the parts being for forward movement of the drive axle.

Fig. 2 is a view similar to Fig. 1, but showing the parts set for rearward movement.

Fig. 3 is a view similar to Fig. 1, but showing the parts set for a short or acute turn.

Fig. 4 is a view similar to Fig. 1, showing the parts in neutral position.

Fig. 5 is an enlarged sectional view through the improved drive mechanism.

Fig. 6 is a detailed sectional view on the plane indicated by the line 6—6 of Fig. 5.

Fig. 7 is a plan view of the clutch reversing sleeve.

Fig. 8 is a sectional view on the line indicated by 8—8 of Fig. 5.

Fig. 9 is a view similar to Fig. 8, but showing the clutch in reversed position; and Fig. 10 is an elevational view of the manual control.

The use of the invention necessitates that the drive axle 20 be in two parts, just as is the case with the axle where the conventional differential gear is employed. The axle with which the present invention is used, however, has a section or part 20a formed with a terminal pilot 21, which enters a socket in the section or part 20b, so that the axle, so far as transverse strains are concerned, functions as if it were a single shaft. The two, however, can rotate relative to each other.

On each of the axle parts or sections is mounted a driven gear, that indicated at 22 being carried on the axle section 20b, and that indicated at 23, carried on the axle section 20a. Both gears incorporate clutches by which their rotary motion is transferred to the axle section and the operation of the clutches is automatic, so that the connected section may exceed in speed the speed of the gear but not fall below the speed of the latter, and this irrespective of the direction of the rotation of the gear. The clutches are reversible in carrying out this function and are described in detail hereinafter.

Either of the gears 22 and 23 is engageable with the drive pinion 24, which is mounted on the propeller shaft 25 and since they will engage this pinion on diametrically opposite sides, the effect is to rotate one in one direction and the other in the opposite direction, so that the axle is driven forwardly when one gear is engaged with the pinion, and rearwardly when the other gear is so engaged. The two gears are interlocked when either is engaged, the gear 23 having a hollow hub portion 26 engageable with the cross sectionally angular flange 27 on the hub 28 of the gear 22. When both are engaged with the drive pinion, however, the interlocking connection between the two hubs is disconnected, so that the two gears move free of each other and as a consequence rotate the connected axle sections or parts in opposite directions.

The means for shifting the gears into and out of engagement with the pinion consists of bell crank levers 29, pivoted as at 30 on some fixed part of the vehicle. The resistance arms of these levers carry shifter forks engageable with the sleeves 31 by which the gears 22 and 23 are moved and the operative position of their attendant clutches effected. The force arms of the levers 29 are connected by means of links 32 with arms 33, one of which is mounted at the lower end of a post 34, and the other at the lower end of a second or hollow post 35. The post 34 is interior to the post 35 and both are enclosed by the column 36, having a supporting base 37 to enable it to be mounted on the floor of the vehicle. The upper end of the collar is formed with a segment 38, the arcuate end of which is bounded with a flange 39 slotted, as indicated at 40 and 41, to provide seats for the shifting levers 42 and 43, respectively. Obviously angular movement of the levers will effect turning movement of the posts and therefore, through the links 32, effect rocking movement of the bell crank levers and the shifting of the gears 22 and 23, so that any of the four possible positions of the latter may be secured, depending on the positions of the levers 42 and 43 with respect to the seats or slots 40 and 41 in the flange 39.

The lever 42 is formed with a hinge joint 44, which will permit the handle end to be raised to free it from an engaged seat. The lever 43 is likewise formed with a hinge joint 45, but this latter hinge joint is spanned with a flat spring 46 tending to force the free end of the lever downward. This, so that when the one lever is seated on top of the other, the joint operation of the two may be effected by grasping the handle of the lever 42.

To interlock the two levers, a pendant pin 47 is provided on the underface of the lever 43 and engages in a slot 48 on the lever 42, this slot permitting relative sliding movement of the two hinged sections when they are both raised when in the interlocked position.

With the levers interlocked, they move as a single unit, so that rocking of the set to dispose them either in the seat 40 or 41 results in engaging either the gear 22 or 23 with the drive pinion 24, as in Figs. 1 and 2. The levers may be operated independently, however, when the two may be engaged in opposite seats, so that the gears 22 and 23 are either both engaged with the driving pinion or both disengaged therefrom, as clearly shown in Figs. 3 and 4.

In the interlocked position of the actuating levers 42 and 43 the interlocked position of the gears 22 and 23 obtains, so that these latter are substantially one unit so far as relative angular or turning movement is concerned, and therefore both axle sections are driven in the same direction, either forwardly or rearwardly, depending on which gear is engaged with the driving pinion. When the operating handles are separated, however, the interlock between the gears 22 and 23 is broken, so that the axle sections are then independent for movement in reverse directions for short turning, if the two gears be engaged, as shown in Fig. 3, or the axle remains at rest, if the two gears be disengaged, as shown in Fig. 4.

The movement of the gears 22 and 23 into and out of engagement with the driving pinion is attended with actuation of clutches, which are incorporated in the gears and by means of which the rotary motion imparted to the latter is communicated to the axle section. The clutches each embody two sets of dogs 49 and 50 selectively engageable with the inner periphery of a flange 51 with which each of the gears 22 and 23 is provided. The dogs act to effect clutching action with the flanges except when the axle sections exceed in speed the speed of the gears. The dogs are pivotally mounted, as indicated at 52, on a flange 53 formed integral with a sleeve 54. The pivot studs 52 serve each in common for a pair of dogs, one of each set, and each dog is formed with a pin 55 passing through a slot 56, of which there is one for the pin at each dog in the flange 57 of a secondary sleeve 58, which surrounds the sleeve 54 but is spaced from the latter, except where the hub portion 59 serves as a bearing to maintain the concentric relation of the two sleeves. The shifter sleeve moves in the space between the sleeves 58 and 54 and is provided with a spiral slot 60, which is entered by pins 61 on the inner periphery of the sleeve 58. The sleeve 60 is permitted axial movement with reference to the sleeve 54, but is precluded against relative angular or turning movement by reason of the key 62a, which slides in the keyway 63a formed in the sleeve 54. Thus, since there may be no relative angular or turning movement between the sleeves 31 and 54, the result of the relative axial movement, by reason of the spiral slots 60, is to swing the sleeve 58 angularly around the sleeve 54 and since the slots 56 are formed in the flange 57 carried in the sleeve 58, either the dogs 49, or the dogs 50, are swung out into engagement with the flange 51, depending on the direction of movement of the sleeve 31. The effect of shifting the sleeve 31 is to effect relative angular or turning movement between the flange 53 and 57, by the former of which the pivot studs of the dogs are carried, and the latter of which the slots 56 are formed into which the pins 55 project.

The sleeve 54 is keyed to its associated axle part, so that there may be no relative turning movement between the two. Thus when the dogs are engaged with the flange of their respective gears and that gear is rotated, the axle part is rotated in consequence. The gears 51 are free turning on the sleeves 54 except when the clutch dogs are engaged and their movement into and out of engagement with the driving pinion is effected by shifting the sleeves 54 along the axle sections.

The flanges 53 and 57 are connected by studs 62, mounted on the former and extending through arcuate slots 63 in the latter, so that relative angular or turning movement is thus limited to the arcuate length of these slots, and by reason of the studs 62 being headed, relative axial movement of the sleeves 58 and 54 is prevented.

The slots 56 are of generally triangular shape with one side wall parallel to a radius of the gear, and the slots of the two sets of dogs are oppositely arranged, so that the pins 55 normally bear against these sides, being held thereagainst by the springs 64 terminally anchored to the pins of the pair of dogs on each pivot stud 52. When one set of dogs is engaged with the flange 51, driving motion from the gear is communicated to the sleeve members and connected axle parts, but should there be a tendency to coast resulting in an increased angular movement of the axle part, the engaged dogs may recede against the action of the springs 64 and thus permit the axle to overrun the gear and provide the conventional free wheeling function, the dogs returning to clutching position when the axle speed drops to that of the gears. One set of dogs, as dogs 49, are engaged with the flanges 51 when the gear 22 is engaged with the driving pinion, and the other set when the gear 23 is engaged with the driving pinion, each set effecting a clutching function except when there is an axle speed tendency in excess of that of the gears.

The sleeves 31 have limited axial movement by reason of the abutment stops 65 on the outer ends of the sleeve 54 and the correspondingly functioning stops 66 positioned directly behind the hub portions 59. Both the stop 65 and 66 are in the form of collars carried by the sleeve 54. The movement of the sleeve 31 with reference to the sleeve 54 first effects clutch changing position and thereafter, by reason of abutting, stop 65 or 66 shifts the attendant gear out of or into engagement with the driving pinion, by reason of the sleeve 54 being then moved along the associated axle section or part.

The clutches permitting angular speed of the axle sections or parts beyond that of the connected gears provides for the outer wheel of a vehicle exceeding the speed of the inner wheel as when the vehicle is making a turn. Thus the mechanism functions as a conventional differential gear.

What I claim as new is:

1. Gearing for the purpose indicated comprising driving and driven members, of which the latter is movable into and out of engagement with the former, a clutch embodied in the driven member between it and the load, and means for shifting the driven member into and out of engagement with the driving member and simultaneously engaging and releasing the clutch.

2. Gearing for the purpose indicated comprising driving and driven members, of which the latter comprises elements selectively movable into and out of engagement with the former for forward and reverse movement of the driven member, each element embodying a clutch interposed between it and the load and operating to permit load speed in excess of, but not less than, the driven member when one of the elements is engaged with the driving member, said clutches being reversible to correspondingly act on the load when the other element is engaged with the driving member, and means for shifting said elements into and out of engagement with the driving member and simultaneously effecting the opposite clutch positions.

3. Gearing for the purpose indicated comprising driving and driven members, of which the latter comprises elements selectively movable into and out of engagement with the former for forward and reverse movement of the driven member, each element embodying a clutch interposed between it and the load and operating to permit load speed in excess of, but not less than, the driven member when one of the elements is engaged with the driving member, said clutches being reversible to correspondingly act on the load when the other element is engaged with the driving member, and means for shifting said elements into and out of engagement with the driving member and simultaneously effecting the opposite clutch positions.

4. Gearing for the purpose indicated comprising a driving member, a two-part axle, and a duality of driven members mounted one each on each of the axle parts, each driven member embodying a clutch interposed between it and the axle part, said driven members being selectively engageable with the driving member, the two being interlocked when one is engaged with the driving member and the clutches being reversible to drive the axle parts in one direction when one driven member is engaged with the driving member and in the other direction when the other driven member is engaged with the driving member.

5. Gearing for the purpose indicated comprising a driving member, a two-part axle, a duality of driven members mounted one each on each of the axle parts and being selectively engageable with the driving member, each driven member embodying a clutch interposed between it and the associated axle part to drive said part in the direction of the driven member, the driven members being both engageable with the driving member to drive the axle parts in opposite directions, the driven members being interlocked when only one is engaged with the driving member but disengaged from each other when both are engaged with the driving member.

6. Gearing for the purpose indicated comprising a driving member, a two-part axle, a duality of driven members mounted one each on each of the axle parts and being selectively engageable with the driving member, each driven member comprising a clutch interposed between it and the associated axle part to drive the said part in the direction of the driven member, said clutches permitting axle speed in excess of, but not less than, the driven member, and means for independently engaging or disengaging the driving member and driven members, said means being provided with a mutual interlock for synchronous operation.

7. Gearing for the purpose indicated comprising a driving member, a two-part axle, a duality of members mounted one each on each of the axle parts and being selectively engageable or simultaneously engageable with the driving member, each driven member embodying a clutch interposed between it and the associated axle part to drive said part in the direction of the driven member and permitting speed in excess of, but not less than, the driven member, and means for independently engaging or disengaging the driving member and driven members, said means being provided with a mutual interlock for synchronous operation.

8. Gearing for the purpose indicated comprising a driving member, a two-part axle, a duality of driven members mounted one each on each of the axle parts and embodying a clutch interposed between it and the associated axle part to drive the latter in the direction of the driven member, the two driven members being interlocked when either one is in engagement with the driving member, the driven members being simultaneously engageable with the driving member, at which time they are disengaged from each other, the clutches permitting axle speed in excess of, but not less than, that of the driven member.

9. Gearing for the purpose indicated comprising a driving pinion, a two-part axle, gears mounted one each on each of the axle parts, a clutch interposed between each gear and the associated axle part and permitting angular speed of said part in excess of that of the connected gear, but not less, means for shifting either gear into engagement with said driving pinion, interlocking connections between said gears when either one is engaged with said pinion, said means being operable to shift both gears into engagement with said pinion simultaneously, at which time they are independent of each other.

10. Gearing for the purpose indicated comprising a driving pinion, a two-part axle, gears mounted one each on each of the axle parts, a clutch interposed between each gear and the associated axle part and permitting angular speed of said part in excess of that of the connected gear, but not less, means for shifting either gear into engagement with said driving pinion, interlocking connections between said gears when either one is engaged with said pinion, said means being operable to shift both gears into engagement with said pinion simultaneously, at which time they are independent of each other, said means being also operable to disengage said gears from said pinion.

11. A vehicle drive axle gearing comprising driving means, a two-part axle, selectively actuable operative connections between said means and axle for driving the latter forwardly or rearwardly, or for driving the two parts simultaneously in opposite directions, and dual control means for said operative connections, said control means being independently operable or engageable for synchronous operation.

12. A vehicle drive axle gearing comprising driving means, a two-part axle, selectively actuable operative connections between said means and axle for driving the same forwardly or rearwardly, or for driving the two-parts simultaneously in opposite directions, and a clutch carried by each axle part and embodied in said operative connections to permit either axle part to exceed in speed, but not fall below, that dictated by the driving means.

13. A vehicle drive axle gearing comprising a two-part axle, a driving pinion, and driven gears mounted one each on each of the axle parts, said gears being selectively engageable with said pinion or simultaneously engaged therewith and being interlocked when either is in engagement with the pinion, but disengaged from each other when both are engaged with the pinion.

14. A vehicle drive axle gearing comprising a two-part axle, a driving pinion, and driven gears mounted one each on each of the axle parts, said gears being selectively engageable with said pinion or simultaneously engaged therewith and being interlocked when either is in engagement with the pinion, but disengaged from each other when both are engaged with the pinion, said gears each embodying a clutch permitting the speed of the associated axle part to exceed but not fall below that of the gear.

15. A vehicle drive axle gearing comprising a two-part axle, a driving pinion, and driven gears mounted one each on each of the axle parts, said gears being selectively engageable with said pinion or simultaneously engaged therewith and being interlocked when either is in engagement with the pinion, but disengaged from each other when both are engaged with the pinion, said gears each embodying a clutch permitting the speed of the associated axle part to exceed but not fall below that of the gear, said clutches being reversible to correspondingly act on the axle part in the event of reversal of said gear.

16. Gearing for the purpose indicated comprising a driving member, a duality of driven members of which each incorporates a clutch interposed between it and the load and operating to permit load speed in excess of, but not less than, its driven member, operative connections between the driven members and the driving member, and independent elements for selectively engaging the driven members with or disengaging them from the driving member, said elements being provided with a mutual interlock.

17. Gearing for the purpose indicated comprising a driving member, a duality of driven members of which each incorporates a clutch interposed between it and the load and operating to permit load speed in excess of, but not less than, its driven member, operative connections between the driven members and the driving member, said operative connections being shiftable to reverse the direction of the driven members and correspondingly change the setting of said clutches, and independent elements for selectively engaging the driven members with or disengaging them from the driving member, said elements being provided with a mutual interlock.

18. Gearing for the purpose indicated comprising a driving member, a duality of driven members selectively engageable with the driving member and having a releasable interlocking connection with each other to drive both driven members forwardly or rearwardly depending on which is engaged with the driving member, means for effecting engagement of either driven member with the driving member and comprising independent elements provided with a mutual interlock.

19. Gearing for the purpose indicated comprising a driving member, a duality of driven members selectively engageable with the driving member and having a releasable interlocking connection with each other to drive both driven members forwardly or rearwardly depending on which is engaged with the driving member, and means for effecting engagement of either driven member with the driving member, and simultaneously maintaining the interlocking connection between the two.

20. Gearing for the purpose indicated comprising a driving member, a duality of driven members selectively engageable with the driving member and having a releasable interlocking connection with each other to drive both driven members forwardly or rearwardly depending on which is engaged with the driving member, and means for effecting engagement of either driven member with the driving member, the last said means comprising a duality of elements independently actuable or engageable with each other for synchronous operation.

21. Gearing for the purpose indicated comprising a driving member, a duality of driven members selectively engageable with the driving member and having a releasable interlocking connection with each other to drive both driven members forwardly or rearwardly depending on which is engaged with the driving member, and means for effecting engagement of either driven member with the driving member, the last said means comprising a duality of elements independently actuable or engageable with each other for synchronous operation, the elements comprising said last named means maintaining the interlocked connection of said driven members when said elements are engaged with each other.

22. A vehicle drive axle gearing comprising driving means, a two-part axle, selectively actuable operative connections between said means and axle for driving the latter forwardly or rearwardly or for driving the two parts simultaneously in opposite directions, and independently operable elements controlling each of said operative connections, said elements being provided with a mutual interlock.

In testimony whereof I hereby affix my signature.

FRANK R. CRAIG.